United States Patent [19]

Lewandowski et al.

[11] Patent Number: 4,499,708

[45] Date of Patent: Feb. 19, 1985

[54] METHOD OF EXTRUDING AND PACKAGING A THIN SAMPLE OF REACTIVE MATERIAL INCLUDING FORMING THE EXTRUSION DIE

[75] Inventors: Edward F. Lewandowski, Westmont; Leroy L. Peterson, Joliet, both of Ill.

[73] Assignee: The United States of America as represented by the United States Department of Energy, Washington, D.C.

[21] Appl. No.: 326,087

[22] Filed: Nov. 30, 1981

[51] Int. Cl.³ .............................................. G21K 1/10
[52] U.S. Cl. ........................................ 53/432; 53/435; 53/122; 72/254; 72/257; 219/69 M; 445/9
[58] Field of Search ...................... 228/115, 116, 176; 420/400; 72/254, 257; 53/432, 435, 510, 122; 445/9; 425/317; 264/210.1, 210.2; 219/69 M

[56] References Cited

U.S. PATENT DOCUMENTS

| | | | |
|---|---|---|---|
| 1,623,323 | 4/1927 | Van Voorhis | 445/9 |
| 1,855,760 | 4/1932 | Holborn | 445/9 |
| 2,085,802 | 7/1937 | Hardy | 428/615 X |
| 2,764,858 | 10/1956 | Cook | 53/432 |
| 2,986,504 | 5/1961 | Goslee et al. | 53/432 |
| 3,334,407 | 8/1967 | De Santis | 228/115 |
| 4,193,403 | 3/1980 | Langston et al. | 604/416 |
| 4,324,970 | 4/1982 | Nanasawa et al. | 219/69 M X |
| 4,403,131 | 9/1983 | Cunningham et al. | 219/69 M X |

Primary Examiner—Kenneth J. Ramsey
Attorney, Agent, or Firm—Charles F. Lind; Robert J. Fisher; Michael F. Esposito

[57] ABSTRACT

This invention teaches a method of cutting a narrow slot in an extrusion die with an electrical discharge machine by first drilling spaced holes at the ends of where the slot will be, whereby the oil can flow through the holes and slot to flush the material eroded away as the slot is being cut. The invention further teaches a method of extruding a very thin ribbon of solid highly reactive material such as lithium or sodium through the die in an inert atmosphere of nitrogen, argon or the like as in a glovebox. The invention further teaches a method of stamping out sample discs from the ribbon and of packaging each disc by sandwiching it between two aluminum sheets and cold welding the sheets together along an annular seam beyond the outer periphery of the disc. This provides a sample of high purity reactive material that can have a long shelf life.

7 Claims, 6 Drawing Figures

METHOD OF EXTRUDING AND PACKAGING A THIN SAMPLE OF REACTIVE MATERIAL INCLUDING FORMING THE EXTRUSION DIE

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

This invention solves a need for a very thin foil of high purity material that is highly reactive to an air atmosphere. Specifically, a lithium sample of thin cross section of less than 0.010 inch and of very high purity was needed for use with neutron bombardment to examine the presence or release of other materials, including titanium. As high purity was needed in the foil, it could not be rolled as that would leave an oil film on the surfaces. Moreover, as lithium is highly reactive in the presence of the air, special care was needed to maintain purity of the fabricated foil. Sodium is another material that is very useful in thin foil form, but it too is highly reactive in air and is most difficult to form.

A likely method of forming such a sample foil might include extruding it; however the formation of the slot in the extension die was particularly difficult. The slot opening, approximately 0.75–1.25 inches long and less than 0.01 inch wide, would thus be formed through a relatively thick wall of a structural material comprising the die. This invention utilizes an electric discharge machine to form the slot.

In an electric discharge machine, the work piece is submerged in a bath of oil and an electrode (typically at ground potential) is moved against the work piece (typically held at a large potential, for example, 250 volts relative to the ground). Arcing under the oil thereby occurs as the electrode approaches and just touches the work piece, and the arcing erodes away or "cuts" the work piece. The work piece must be flushed with the oil during the cutting operation. It is possible to use a fine wire as the electrode for simply cutting the work piece in two, or by means of elaborate camming and guiding means for cutting exotic shapes in the work piece. If the "cut" desired is a hole or slot, the shape of the electrode can determine the shape of the cut by simply moving the electrode into the work piece. If the electrode is large in cross section, it generally is of hollow construction and the oil can be pumped through it and against the work piece. Prior to this invention, the electric discharge machine did not function properly in cutting a slot with a narrow or thin electrode.

SUMMARY OF THE INVENTION

This invention relates to an improved means for utilizing an electrical discharge machine in order to cut a narrow slot in an extrusion die, for then using the die in an inert atmosphere for extruding a very thin foil of a reactive metal such as of sodium or lithium, and for then encapsulating the foil in a sealed pack of aluminum or other impervious material.

DESCRIPTION OF THE PREFERRED EMBODIMENT

Figure 1:
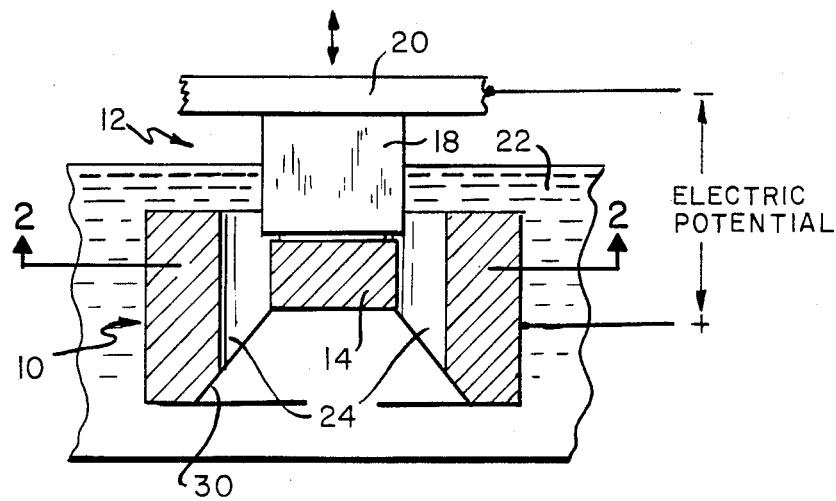
FIG. 1 is a schematic view of an electrical discharge machine shown in operative association for cutting a slot in an extrusion die.
Figure 2:
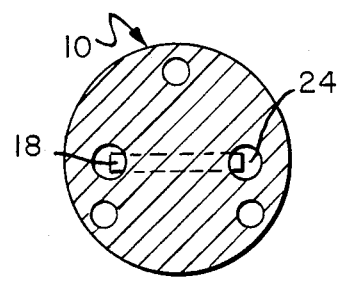
FIG. 2 is a sectional view as seen from line 2—2 in FIG. 1.
Figure 3:
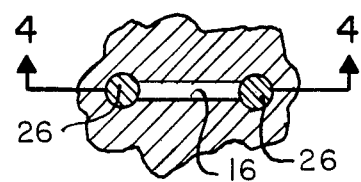
FIG. 3 is a sectional view like FIG. 2, except showing the die after fabrication has been completed and with plugs in place closing certain fabrication openings.
Figure 4:
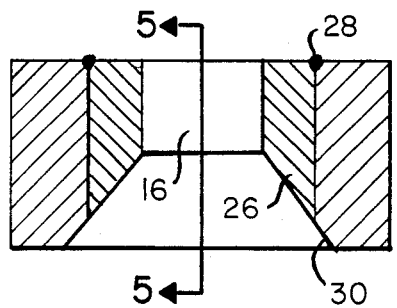
FIG. 4 is a sectional view as seen from line 4—4 in FIG. 3.
Figure 5:
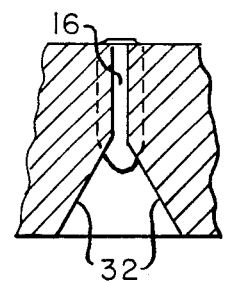
FIG. 5 is a sectional view as seen from line 5—5 in FIG. 4.
Figure 6:
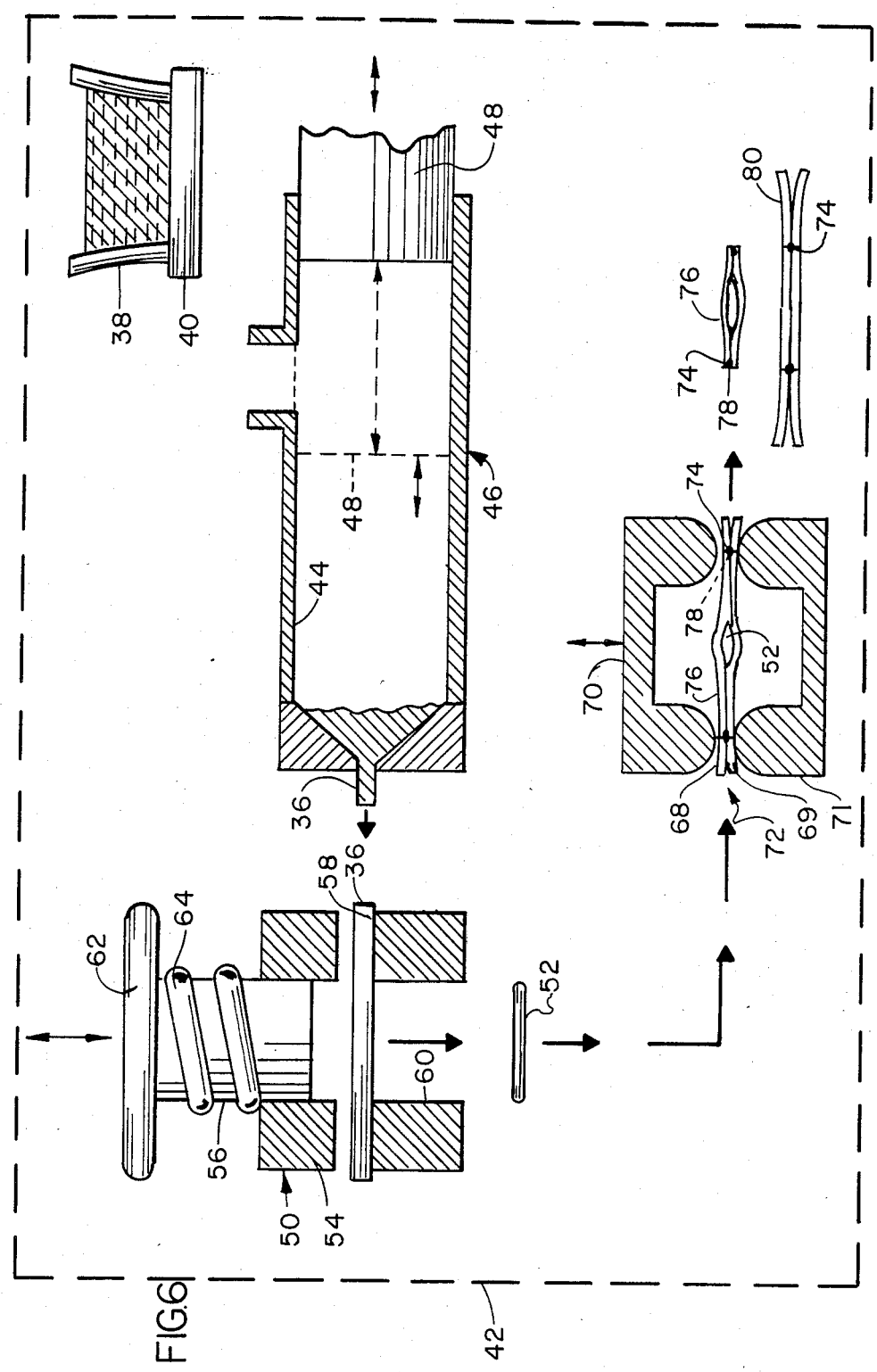
FIG. 6 is a flow diagram showing in schematic cross section several machines used to form the sample with the extrusion die of FIGS. 1-5.

FIGS. 1-5 illustrate an extrusion die 10 in a schematic representation of how it is made with an electric discharge machine 12. The die 10 has a wall 14 through which a slot 16 (FIGS. 3-5) is to be formed so that a thin ribbon can be extruded from the slot. The slot 16 thus can be in excess of 1 inch in length, but less than 0.01 inch in width; and the wall 14 initially is generally in excess of 0.1 inch thick. The die will typically be formed of a structural material like steel.

In order to form the slot 16 in the wall 14 of the die or work piece, a carbon electrode 18 formed to a very thin rectangular cross section is used, connected to frame 20 of the electric discharge machine 12. The electrode 18 is slightly wider than the length of cut (approximately the length of the slot 16), is slightly thinner than the width of the cut, and is longer than the thickness of the wall 14.

The normal techniques of using the electric discharge machine is to mount the electrode normal to the work piece and then to move the electrode 18 straight into the work piece 10. The electrode 18 is generally at ground potential and the work piece 10 is held at a high potential (for example 250 volts) relative to the ground. Arcing thus occurs between the electrode 18 and the work piece 10 as they approach sufficiently close together or even touch; and this arcing is done in a bath of oil 22. The oil thus flushes away the material of the work piece 10 as it is eroded away by the arcing. With the extremely thin electrode 18 described herein, there was insufficient oil flushing of the slot during cutting.

The invention provides drilling two holes 24 at the opposite ends of where the slot 16 is to be formed so that the oil can be circulated through these holes and the slot as the slot is being cut in the work piece 10, upon the electrode 18 being advanced toward and into the work piece. The holes 24 are larger than approximately 0.1 inch and possibly even as large as 0.5 inch, depending in part on the thickness of the wall 14. After the slot is cut in the work piece, the holes 24 are closed by metal plugs 26 (FIGS. 3-5) welded as at 28 to the die wall 14. This thereby leaves only the narrow slot 16 as a through opening in the die 10. The interior walls 30 and 32 of the die 10 are preferably tapered toward the slot 16, and each plug 26 can also be tapered at the inner end to match up flush with the wall 30.

Another aspect of the invention is to extrude a solid material, even a material such as sodium or lithium that is highly reactive to air or moisture, through the die slot 16 to form a thin ribbon or foil 36. Specifically, the material is melted in a vessel 38 on a hot plate 40 and the molten material is then poured into cylinder 44 of a press 46, confined by plunger 48 in the cylinder by shifting the plunger from that illustrated in solid to that illustrated in phantom, and allowed to cool to a solid. The press is then actuated to shift the plunger 48 to the left in FIG. 1 beyond that shown in phantom to extrude the solid material as the very fine ribbon or foil 36 out the slot 16. If the material is reactive, this is all done in an inert atmosphere of argon, nitrogen, helium, etc. such as in a glovebox 42.

Thereafter, separate slugs 52 of the foil are stamped from the ribbon 36 in a fixture 50. The slugs 52 are shaped and sized as needed, but typically might be cylindrical discs between 0.5 and 1.0 inch in diameter. The fixture 50 has a frame 54 with a moving punch 56 sized and shaped like the desired disc, a bed 58 to support the underside of the ribbon 36, and an opening 60 in the bed under the punch to receive the disc as it is severed from the ribbon. The punch 56 can be hand actuated by striking head 62, and spring 64 returns the punch to the up position as illustrated. This stamping operation preferably also is performed in the inert atmosphere of the glovebox 42, particularly if the ribbon material is reactive.

Each formed disc 52 is then sandwiched between two larger foil-like sheets 68, 69 of aluminum preferably each between 0.05 and 0.2 inch thick. The meeting peripheral edges of the aluminum sheets outwardly beyond the disc 52 are then cold welded together between press heads 70, 71 of hydraulic press 72 by moving the heads initially against the sheets and then with a force sufficient to generate pressures of perhaps up to 20,000 psi. The rounded faces of the press heads not only form the cold weld seam 74 annularly of the disc to seal the disc in a sample pouch 76, but also sever the sheets sufficiently along line 78 to allow the resultant sample pouch 76 to be separated from the remaining annular scrap piece 80. The sample pouch 76 thus encapsulates the disc 52 of material of extreme purity and of very thin cross section in isolation from the air atmosphere for durability and extended shelf life. This packaging of the disc in the protective pouch 76 also is preferably performed in the inert atmosphere of the glovebox 42, again particularly if the material is reactive.

The thin disc sample as formed herein of highly reactive material of laboratory grade purity can be used in very sophisticated tests involving a thermal reactor and the bombardment or radiation by neutrons in a selected environment. The sealed sample pouch 76 maintains the disc isolated from the atmosphere for long shelf life, but also can be examined by accurate weight charges, etc., for analyzing the reaction with, attraction to or release of any component from the disc. A specific use for such a sample is outlined in Argonne National Laboratory Report ANL/NDM-55 entitled "Thermal Neutron Calibration of a Tritium Extraction Facility Using the $^6$Li(n,t)$^4$He/$^{197}$Au(n,$\gamma$)$^{198}$Au Cross Section Ratio for Standardization" by M. M. Bretscher and D. L. Smith.

The embodiments of the invention in which an exclusive property or privilege is claimed are defined as follows:

1. In a method of using an electric discharge machine for forming a very narrow slot in a work piece with an electrode of thin cross section even narrower than the slot, comprising the steps of forming in the work piece typically by drilling two openings significantly large in diameter than the slot width at the opposite ends of where the slot will be, imposing a large potential between the electrode and the work piece, advancing the electrode toward the work piece to cause arcing under a bath of oil, whereby the slot is cut from the work piece and the slot as being cut is flushed by oil in the openings, and plugging the through openings with a durable solid material to leave only the slot.

2. A method of forming a very thin sample of reactive material, comprising the steps of melting the reactive material until it is in the liquid phase and then pouring the liquid reactive material into an extrusion cylinder and allowing it to cool to a solid, extruding a ribbon of the reactive material of thickness required of the sample, stamping out from the ribbon a disc of convenient shape and required size, sealing the disc in a protective package, and performing the previous steps in an inert atmosphere.

3. A method of forming a sample according to claim 2, wherein the protective package is an aluminum pouch formed by the steps of sandwiching the disc between two larger thin sheets of aluminum, and cold welding as a continuous annular seal the lapped edges of the aluminum sheets together in the area peripherally outside the disc.

4. A method of forming a sample according to claim 2, wherein the ribbon has a width in excess of 0.5 inch and a thickness of less than 0.01 inch.

5. A method of forming a sample according to claim 2 further providing the steps of forming a die to extrude the material through, wherein the work piece (die) first has larger openings formed therethrough spaced apart by the approximate width of the ribbon that will be extruded, and then using a very thin electrode in an electrical discharge machine to cut the slot between the openings in an oil bath whereby the bath oil moving within the openings provides flushing of the material away from the slot as the slot is being formed.

6. A method of forming a sample according to claim 5, wherein the steps of forming the die further include plugging the larger openings in the work piece with a durable material to leave only the slot in the die.

7. A method of forming a sample according to claim 6, wherein the ribbon has a width in excess of 0.5 inch and a thickness of less than 0.01 inch.

* * * * *